United States Patent [19]

Barnes

[11] Patent Number: 4,837,656
[45] Date of Patent: Jun. 6, 1989

[54] MALFUNCTION DETECTOR

[76] Inventor: Austen B. Barnes, 2250 Midland Avenue, Unit 24, Scarborough, Ontario, Canada, M1P 4R9

[21] Appl. No.: 19,692

[22] Filed: Feb. 27, 1987

[51] Int. Cl.[4] .................... H01H 47/28; H01H 47/32; H01H 9/00
[52] U.S. Cl. .................... 361/185; 361/189; 340/652
[58] Field of Search .................... 361/189, 190, 185; 307/98, 99, 115; 324/421; 340/640, 652

[56] References Cited

U.S. PATENT DOCUMENTS

| | | | |
|---|---|---|---|
| 3,597,661 | 8/1971 | Isaacs | 361/190 |
| 4,074,602 | 2/1978 | Brower | 361/189 |
| 4,500,775 | 2/1985 | Sangu et al. | 340/652 |
| 4,677,282 | 6/1987 | Walsh | 340/640 |

FOREIGN PATENT DOCUMENTS

| | | | |
|---|---|---|---|
| 0055569 | 5/1977 | Japan | 324/421 |
| 0063675 | 6/1978 | Japan | 324/421 |

Primary Examiner—L. T. Hix
Assistant Examiner—David Porterfield
Attorney, Agent, or Firm—Remy J. VanOphem

[57] ABSTRACT

A malfunction detector is connected to switches provided in a machine, such as a punch press, for actuation when a malfunction occurs. The detector is capable of supplying an alternating current test signal to the switches and determining whether the resistance of the switches to the test signal is greater than or less than a threshold value. The test signal preferably has a frequency which is equal to mains supply frequency or a harmonic thereof and the malfunction detector preferably only responds to changes of state of the switches during specific time windows.

7 Claims, 8 Drawing Sheets

MALFUNCTION DETECTOR

BACKGROUND OF THE INVENTION (1) Field of the Invention

The present invention relates to a malfunction detector for detecting malfunction in a machine.

(2) Description of the Prior Art

Malfunction detectors are known for detecting malfunctions in machines, such as punch presses or die stamping machines. Switches are mounted in such machines so as to be actuated for turning on or off in response to certain operations. In order to safeguard the machine, for instance so as to prevent it from damaging itself should a malfunction occur, such a malfunction detector monitors the state of the switches and is arranged to recognize any invalid state so as to warn an operator and/or automatically stop the machine.

The switches applied to such machines normally have one pole connected to the machine frame and the other pole connected to the known malfunction detector. A direct current is injected into the frame of the machine and the malfunction detector detects the passage of direct current via any switch which is closed so as to monitor the switching state of the switches. However, voltage surges and increasing or decaying alternating current waves have direct current components and this leads to the problem that interference from such sources can be caused by voltages being induced into the sensing lines between the switches and the malfunction detector from fluctuating voltages and currents in adjacent circuits and in the power supply to the machine. The input stages of the malfunction detector, therefore, have to be designed so as to be insensitive to such interfering signals, but nevertheless interfering signals of large magnitude can still cause incorrect sensing of the states of the switches, leading to incorrect operation of the malfunction detector.

Problems can also be encountered with the switches themselves. Because the test signal applied to them is a direct current, the contacts may be susceptible to electrolysis. Also, the switch contacts may be subjected to contamination, for instance by lubricating oil, cooling liquid, and metal particles. Thus, the resistance of the switches can change with time so that the theoretically zero resistance when the switch is closed can become a significant resistance value and the theoretically infinite resistance when the switch is open can be reduced to a finite value which cannot be ignored. Since the input circuits of known malfunction detectors check for open and closed switch states, the degradation with time or the switching states can cause spurious and incorrect readings, again leading to incorrect operation of the malfunction detector.

In cyclic machines, i.e., machines which repeat a cycle of operations over and over again, it is usual for the state of certain switches which monitor the cyclic operation to be tested during a specific time period related to the cycle or operation. In other words, such switches are monitored only during a predetermined portion of each cycle of operation. The known malfunction detectors respond to the switching state of the switches and it is, therefore, possible for erroneous detection to occur. In particular, if one of the switches fails in its state indicating that operation of the machine is correct, than this switch will be monitored during each monitoring period and the malfunction detector will indicate that operation is correct when, in fact, the switch is no longer monitoring the operation. The detector may, therefore, fail to detect a malfunction, and this can lead to damage of the machine, damage of a part being produced or acted upon by the machine, and possibly injury to personnel.

SUMMARY OF THE INVENTION

According to one aspect of the invention, there is provided a malfunction detector for detecting a malfunction in a machine having switch means responsive to an operational parameter of the machine, the malfunction detector including supplying means for supplying an alternating current test signal to the switch means and determining means for determining whether the resistance of the switch means to the alternating current test signal exceeds a threshold value.

By using an alternating current test signal, the problems of electrolysis are substantially avoided. Also, monitoring the resistance of the switch means allows the malfunction detector to respond more reliably to the state of the switch means without being susceptible to variations in the on and off resistance values, for instance caused by contamination of switch contacts or aging of switching devices. Such a malfunction detector, therefore, provides more reliable operation.

Preferably, the alternating current test signal has a frequency equal to mains supply frequency or a multiple thereof and has a phase which is shifted by a predetermined amount with respect to the mains supply. By using synchronous or phase detection locked to the test signal in the malfunction detector, the sensitivity of the detector to interference, for instance induced in the test lines from the switch means to the detector, is greatly reduced making the detector substantially immune from spurious and interfering signals. This immunity may be further improved by arranging for the detector to respond only upon the presence or absence of a predetermined number of cycles of the test signal.

The malfunction detector may include means for deactivating the machine in the event of detection of a malfunction, which has a series connected electromagnetic relay contact and a semi-conductor switch, such as as a triac. The triac may be used for switching the supply current, for instance at zero crossing thereof, with the relay contact being arranged to open and close when current has been switched off by the triac so as to avoid arcing between the relay contact elements. The relay contact provides back-up for the semi-conductor switch, which may fail in its short-circuit mode. Switch-off reliability is, therefore, substantially improved.

According to another aspect of the invention, there is provided a malfunction detector for detecting a malfunction in a machine having switch means responsive to an operational parameter of the machine, the malfunction detector including timing means for generating a timing window and detecting means for detecting a change from a first switching state to a second switching state of the switch means during the timing window.

By responding to a change of state of the switch rather than to the existing state of the switch during the timing window, the detector does not produce an erroneous response, for instance to a switch means which has failed in a "safe" switching state. The reliability of the malfunction detector is, therefore, greatly improves when monitoring cyclic operation or a machine.

BRIEF DESCRIPTION OF THE DRAWINGS

The invention will be further described, by way of example, with reference to the accompanying drawings, in which.

DETAILED DESCRIPTION OF THE PREFERRED EMBODIMENT

Figure 1:
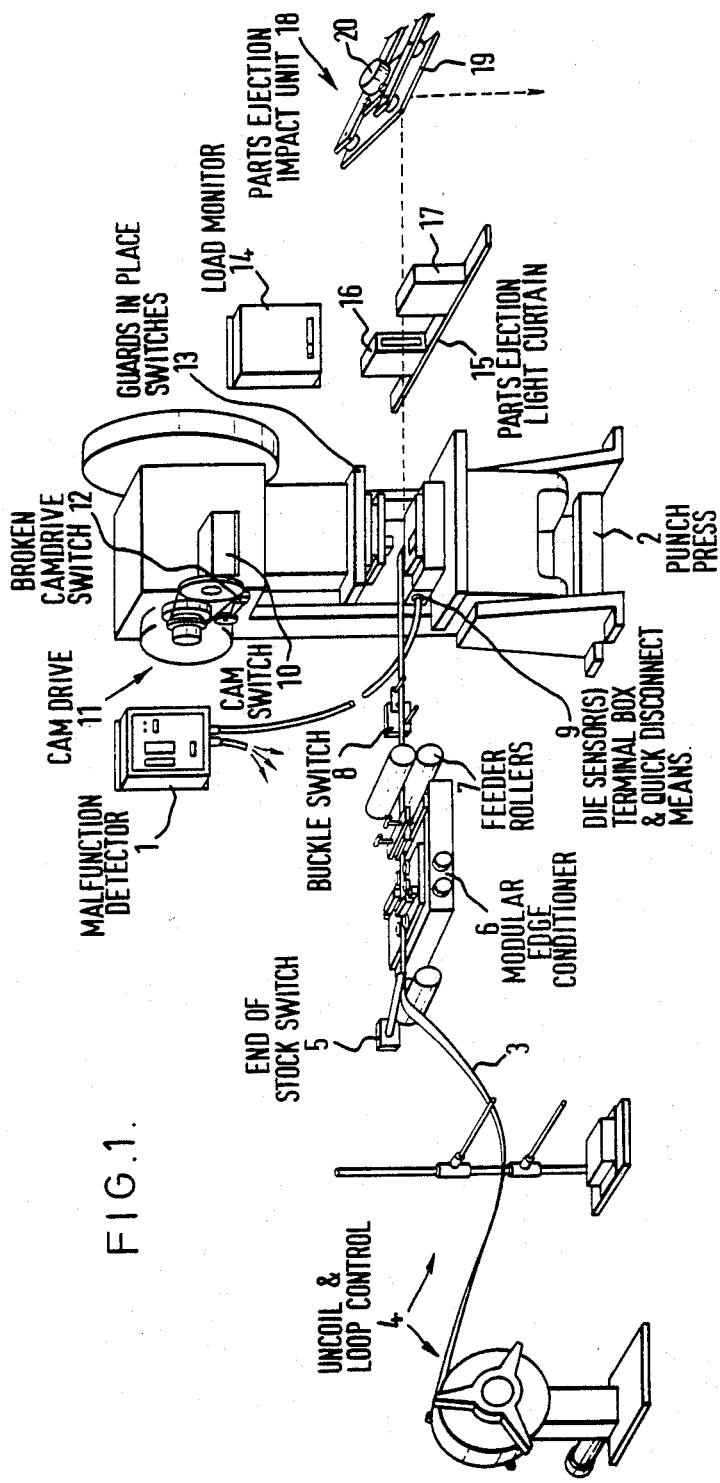
FIG. 1 illustrates an application of a malfunction detector constituting a preferred embodiment of the invention to a punch press machine.

FIG. 1 shows a malfunction detector 1 arranged to monitor the operation of a punch press 2. Metal strip stock 3 is supplied from an uncoil and loop control means 4 via an end of stock switch 5, a modular edge conditioner 6, feeder rollers 7, and a buckle switch 8 to the punch press 2. The punch press 2 has a punching die for stamping finished parts from the strip 3, provided with die sensors connected to a terminal box and quick disconnect means 9. The die and the sensors form a modular unit mounted on the punch press 2 and can be removed and exchanged for another die with appropriate sensors in order to punch different types of parts from the strip 3.

The punch press 2 has a cam switch 10 for controlling cyclic operation of the punch press. The cam switch is provided with a cam drive 11 in the form of driving and driven pulley wheels connected by a chain, the driving pulley wheel being driven by the press crankshaft (not shown). A broken cam drive switch 12 is composed of a lever-operated microswitch with a follower roller rotatably mounted on the lever and engaging the chain of the cam drive 11.

A plurality of "guards in place" switches 13 are located around the die monitor the guards which are installed to prevent accidental damage or injury during pressing operations.

A load monitor 14 associated with the punch press 2 monitors the load thereon in order to detect any overload thereof.

Means are provided for monitoring ejection of parts pressed out of the metal strip 5 by the punch press 2. Two means are shown in FIG. 1, although normally only one such means would be provided. The first means is a parts ejection light curtain 15. The light curtain 15 has an elongate light source 16 directing a light curtain onto an elongate photoelectric transducer 17 located such that the normal path of parts ejected from the punch press 2 passes through the light curtain. The second means is a parts ejection impact unit 18 which has a plate 19 arranged in the normal path of ejected parts to deflect parts which are properly ejected from the punch press 2. A vibration sensing transducer 20, such as a piezoelectric transducer, is attached to the rear of the plate 19 so as to produce a signal whenever an ejected part strikes the plate 19.

Figure 2:
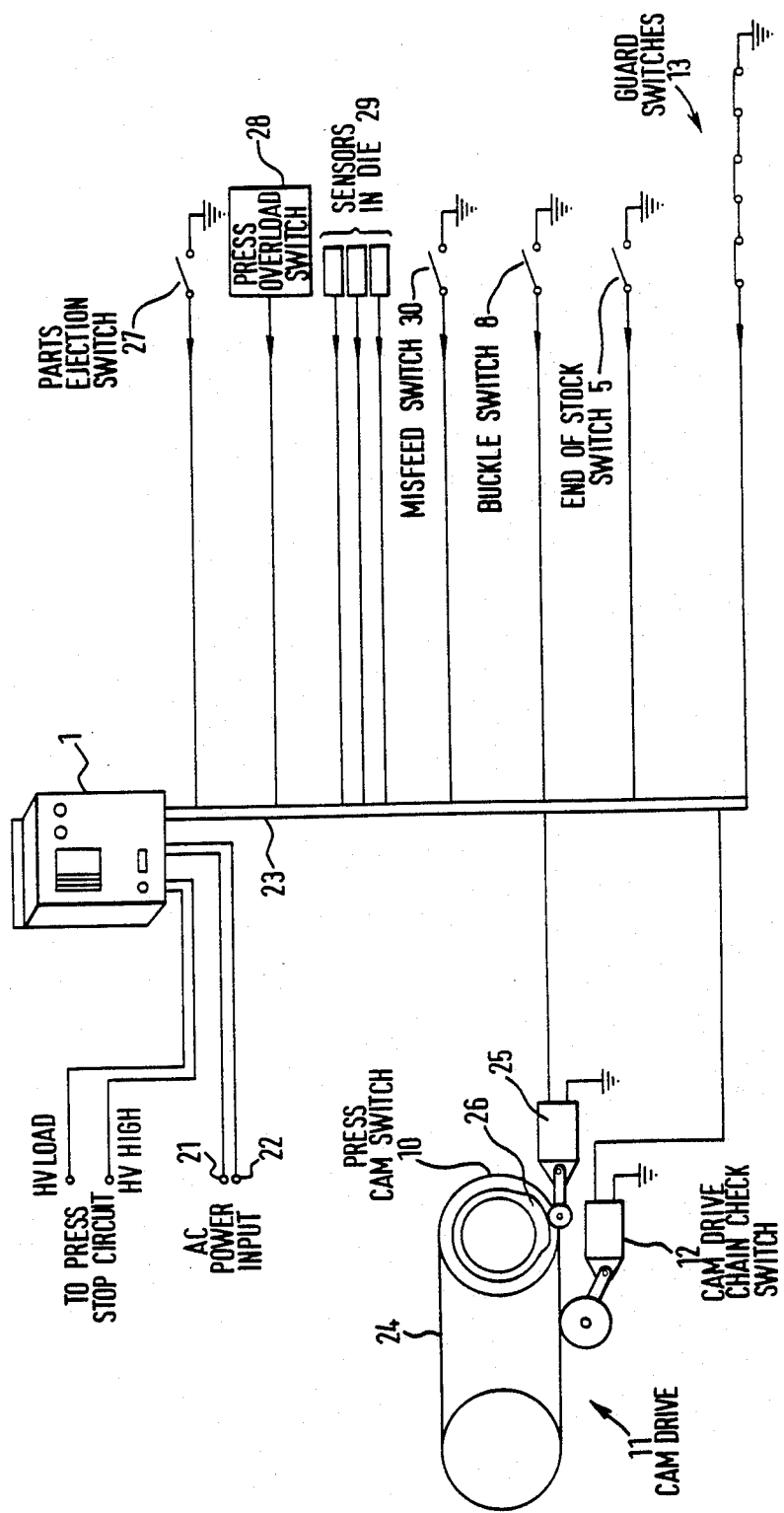
FIG. 2 is a wiring diagram showing connections to the malfunction detector of FIG. 1.

FIG. 2 illustrates connection of the malfunction detector 1 to the punch press 2 and associated parts shown in FIG. 1. The detector 1 has terminals 21 and 22 for connecting to an alternating current power input, such as the mains power supply. The detector 1 has output terminals HVLOAD and HVHIGH for connection in a press stop circuit for stopping the punch press 2 upon detection of a malfunction.

The detector 1 has a multiple input 23 connected to the various switches and sensors associated with the arrangement shown in FIG. 1. The cam drive chain check switch 12 corresponds to the broken cam drive switch of FIG. 1 and monitoring the chain 24 of the cam drive 11. FIG. 2 shows the press cam switch 10 and also shows a press timing swithch 25 which cooperates with a timing cam 26 mounted on the shaft of the cam switch 10. The switch 25 provides timing window signals for the detector 1 as will be described hereinafter. Alternatively, such signals may be provided by suitable contacts within the cam switch 10.

The multiple input 23 is also connected to a parts ejection switch 27 within the light curtain 15 or to the impact unit 18, to a press overload switch 28 provided in the load monitor 14, to sensors 29 provided in the die of the punch press 2, to a misfeed switch 30 located in the modular edge conditioner 6, to the buckle switch 6, to the end of stock switch 5, and to the series-connected guard in place switches 13. The guard switches 13 are arranged to be normally closed during correct operation whereas the other switches are arranged to be normally open during correct operation in the embodiment shown in FIG. 2.

Figure 3:
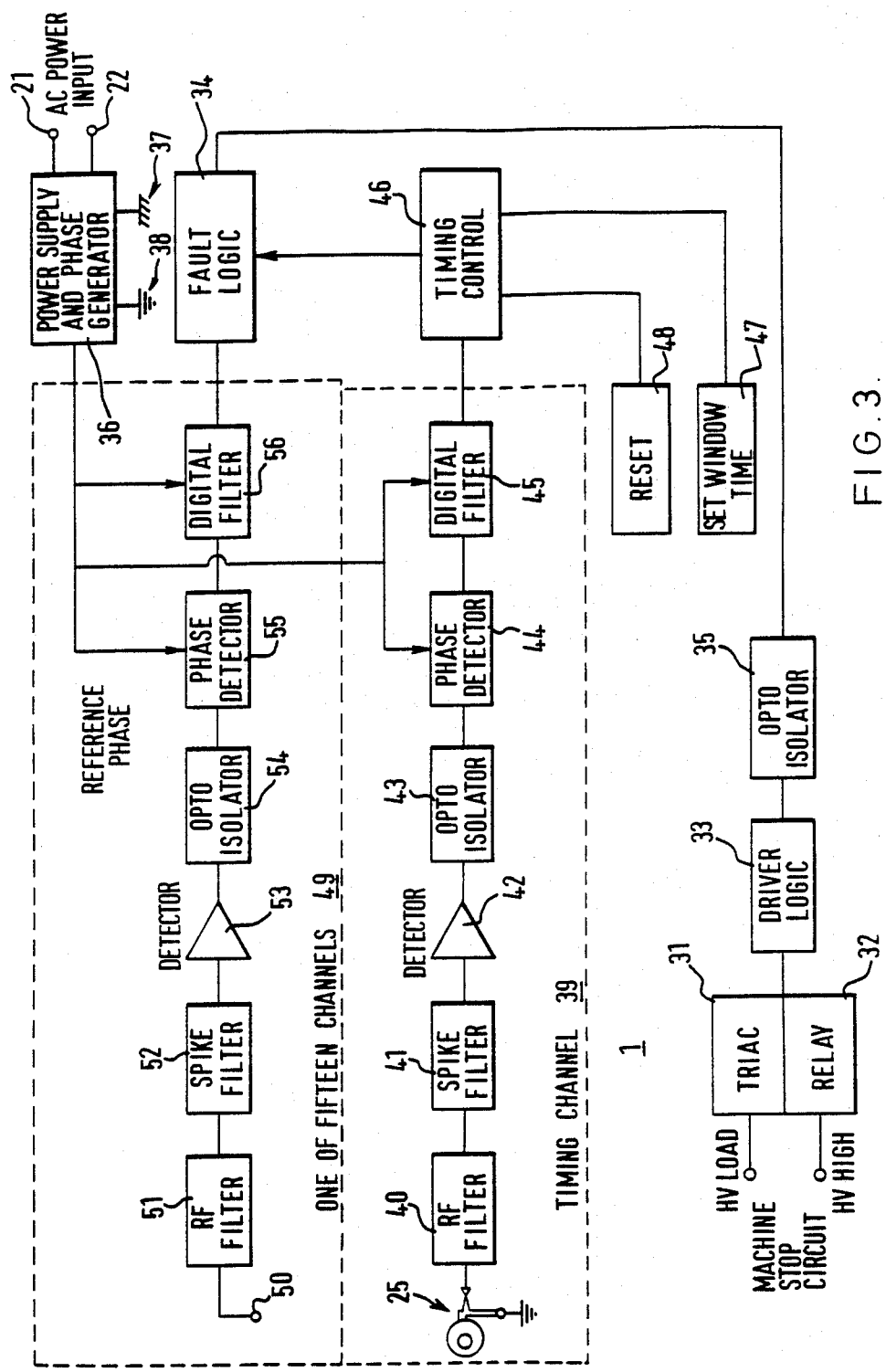
FIG. 3 is a block schematic diagram of the malfunction detector of FIG. 1.

As shown in FIG. 3, the malfunction detector comprises a triac 31 and relay 33 connected in series between the contacts HVLOAD and HVHIGH. The triac and relay are controlled by a driver logic circuit 33 which receives input signals from a fault logic circuit 34 via an optoisolator 35. The optoisolator 35 isolates the high power circuitry which includes the triac 31, the relay 32, and the circuit 33, from the remainder of the detector so as to avoid interference with the fault logic cirucits 34 caused by the presence of relatively large interfering signals in the high power circuit.

The alternating current power input terminals 21 and 22 are connected to a power supply and phase generator circuit 36. The circuit 36 provides two isolated power supplies for the detector, one of which is used for the fault logic circuit 34 and other circuits connected thereto whereas the other is used for the high power circuit and for parts of the input circuitry connected directly to switches and sensors. Separate common or earth connections 37 and 38 are provided to ensure correct isolation so as to improve the immunity of the detector to interference. The circuit 36 includes a phase generator for generating an alternating current test signal and a reference phase signal as will be described hereinafter.

The detector 1 includes a timing channel 39 which is connected to the switch 25 and provides signals for timing purposes in accordance with the cyclic operation of the punch press 2. The switch 25 is connected via a radio frequency filter 40 for eliminating radio frequency interference and a spike filter 41 for eliminating spike-like interfering signals to a detector 42. The output of the detector is connected via an optoisolator 43 to a phase detector 44 which also receives the reference phase signal from the supply circuit 31. The output of the detector 44 is connected to a digital filter 45 which also receives the reference phase signal and whose output is connected to a timing control circuit 46.

In order to monitor cyclic operations, the malfunction detector is capable of operating in either of two timing modes. In the first mode, a timing window is defined by the period during which the switch 25 is actuated by the timing cam 26. In the case of a normally open switch 25, this timing window is defined by the period during which the switch 25 is closed, and vice versa for a normally closed swtich. In the alternative mode, an internal timer within the timing control circuit 46 is triggered by opening or closing of the switch 25 and generates a timing window whose period or duration is set by a set window time control 47. The timing control circuit 46 is also connected to a reset switch 48 which is used for resetting the detector after a malfunction has been detected and remedial action taken. The output of the timing control circuit 46 is connected to the fault logic circuit 34.

The malfunction detector 1 further includes fifteen identical input channels, only one 49 (the Nth, where (n=1...15) of which is shown in FIG. 3. The channel 49 has an input 50 for connection to one of teh sensor switches shown in FIG. 2. The remainder of the channel is composed of a radio freuqency filter 21, a spike filter 52, a detector 53, optoisolator 54, a phase detector 55, and a digital filter 56 which are substantially identical to the corresponding components of the timing channel 39. The output of the digital filter 56 is connected to the fault logic circuit 34.

Figure 4:
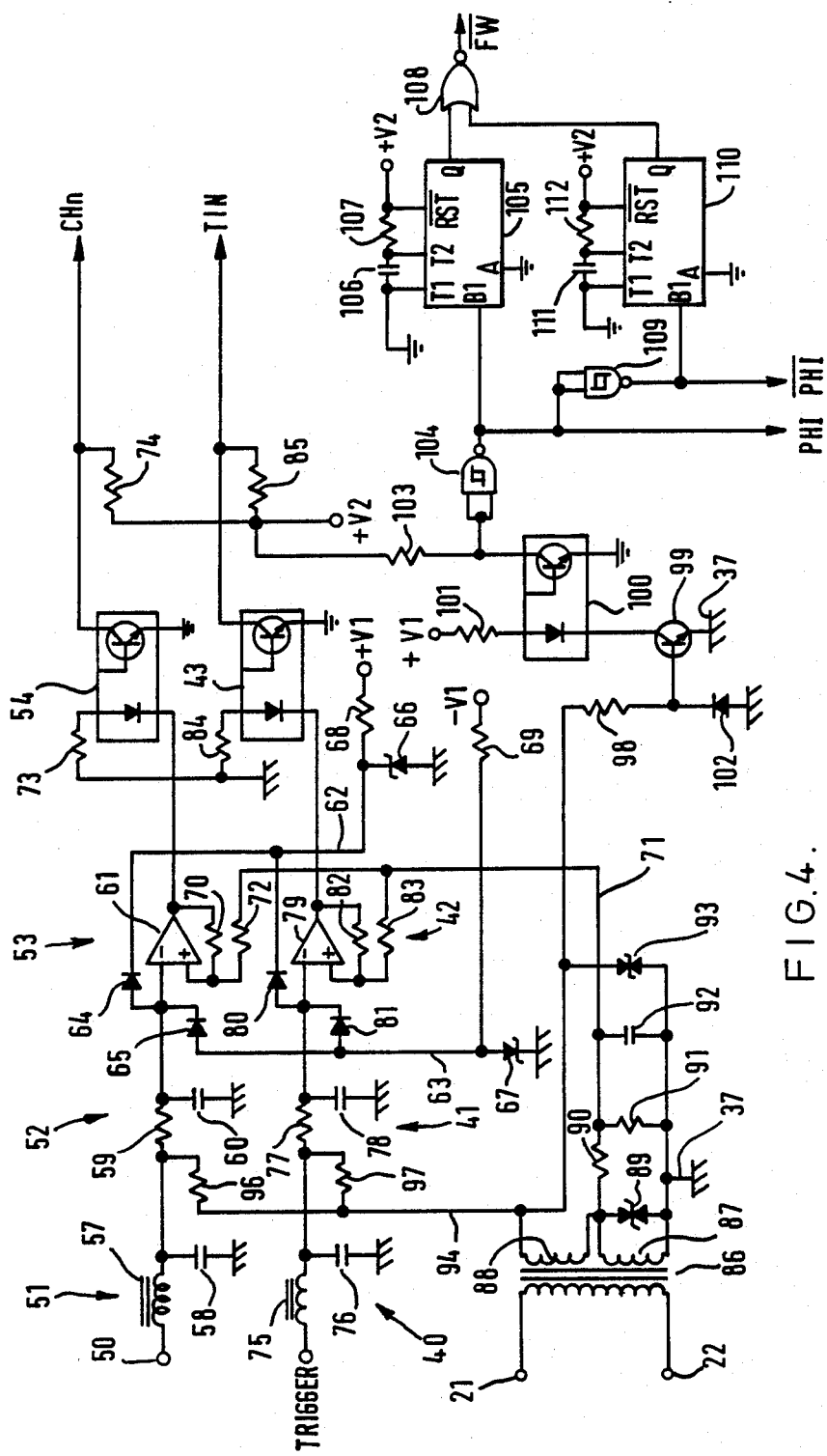
FIGS. 4 and 8 are circuit diagrams of the major parts of the malfunction detector of FIG. 1.

FIG. 4 shows parts of one of the input channels, the timing channel, and the phase generator. The input terminal 50 is connected via the radio frequency filter, which incluudes as inductor 57 and a capacitor 58, and via the spike filter 52, which includes a resistor 59 and a capacitor 60, to the inverting input of an operational amplifier 61 forming part of the detector 53. The inverting input is also connected to positive and negative reference voltage lines 62 and 63 via diodes 64 and 65, respectively. The positive and negative reference voltages are provided by zener diodes 66 and 67 and dropping resistors 68 and 69, respectively, from positive and negative power supply lines +V1 and −V1. This arrangement has two functions, one of which will be described hereinafter and the other of which is to limit the voltage which can be applied to the inverting input of the amplifier 61 so as to protect it against the possible application of otherwise harmful voltages.

The operational amplifier 61 is connected as an alternating current comparator and has its non-inverting input connected to its output via a resistor 70 and to a reference line 71 via a resistor 72. The output of the comparator is connected to the light emitting element of the optoisolator 54 which is provided with a current-limiting resistor 73. The light sensitive element of the optoisolator 54 is connected via a biasing resistor 74 to another positive supply line +V2 and provides an output CHn to the following part of the input channel.

The timing channel has a TRIGGER input for connection to the switch 25 and includes components 75 to 85 which correspond to and perform the same functions as the components 58 to 61, 64, 65, 70, and 72 to 74, and will not be described further.

The phase generator includes a mains transformer 86 whose primary winding is connected to the alternating current power input terminals 21 and 22. The transformer 86 has two six volt secondary windings 87 and 88 connected in series. The first secondary winding 87 is connected across back-to-back limiting zener diodes 88 for providing a clipped sinewave and to a potential divider composed of resistors 90 and 91. The output of the potential divider is connected across a capacitor 92 and supplies a 1 volt RMS alternating reference signal to the line 71.

The series-connected secondary windings 87 and 88 are connected across another back-to-back zener diode arrangement 93 and between a test signal line 94 and the common line 37. The test signal line 94 is connected via a respective resistor 96 to each of the input channels and via a resistor 97 to the timing channel so as to provide an alternating current test signal for the switch connected to the corresponding input.

The test signal line 94 is also connected via a resistor 98 to the base of a transistor 99 whose emitter is connected to the common line 37 and whose collector is connected to the light emitting element of an optoisolator 100 and provided with a current limiting resistor 101. A diode 102 is connected across the base-emitter junction of the transistor 99 to limit reverse-biasing thereof so that the transistor conducts on positive half cycles and is cut off on negative half cycles. The output of the optoisolator 100 is connected to the supply line +V2 via a load resistor 103 and to the inputs of a Schmitt NAND gate 104 connected as an inverter.

The output of the inverter 104 is connected to the trigger input of a monostable multivibrator 105 provided with a timing capacitor 106 and a timing resistor 107. The output of the mononstable multivibrator 105 is connected to a first input of a NOR gate 108. The output of the inverter 104 is also connected via a Schmitt NAND gate 109 connected as an inverter to another monostable multivibrator 110 provided with a timing capacitor 111 and a timing resistor 112. The output of the monostable multivibrator 110 is connected to a second input of the gate 108. The outputs of the gates 104, 109, and 108 provide timing signals PHI, $\overline{\text{PHI}}$, and $\overline{\text{PW}}$, respectively.

Figure 5:
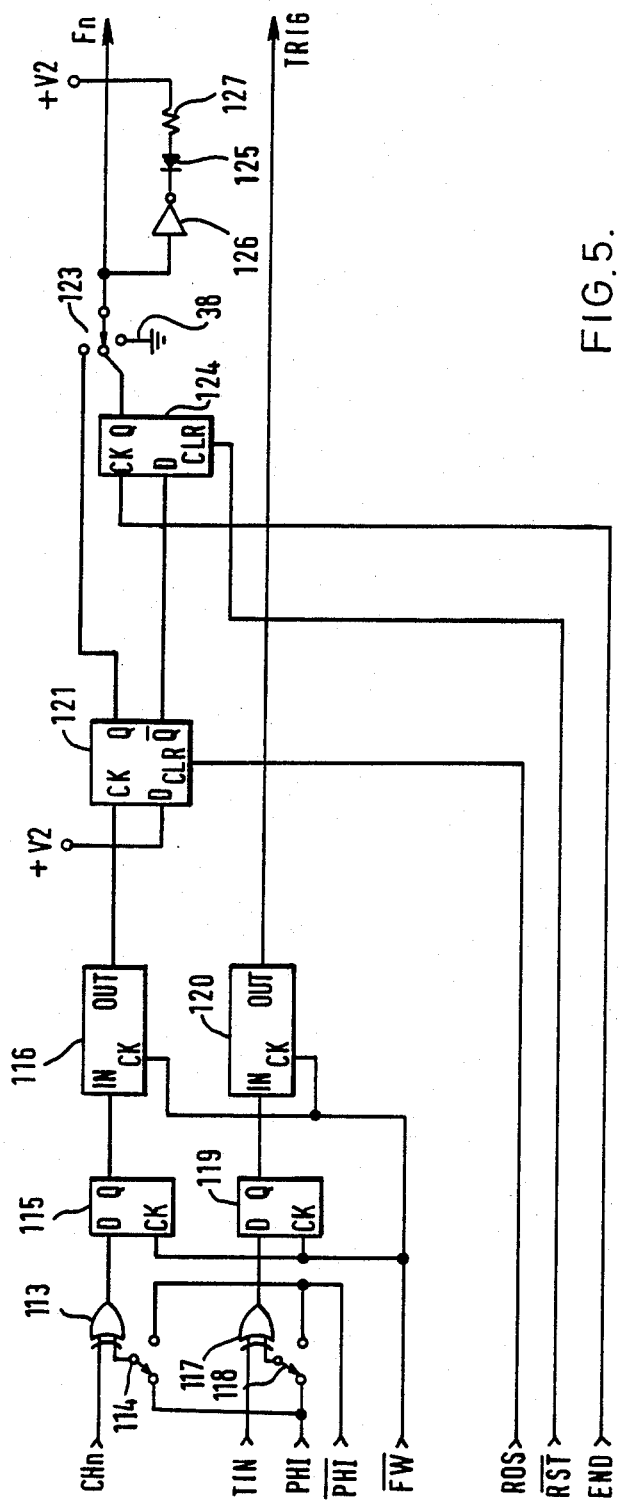

FIG. 5 shows the remaining parts of the nth input channel and the timing channel. The signal CHn is supplied to one input of an EXCLUSIVE-OR gate 113 whose other input is connected to a two-way switch or link arrangement 114 for connecting the input of the gate 113 to receive the signal PHI or the signal $\overline{\text{PHI}}$ in order to preset the input channel for use with normally closed or normally open switch contacts as its input.

The output of the gate 113 is connected to the data input of a D-type flip flop 115 whose clock input is connected to receive the signal $\overline{\text{FW}}$. The Q output of the flip flop 115 is connected to the input of a contact bounce eliminator 116 (part of CMOS integrated circuit type MC14490B, for example) whose clock input also receives the signal $\overline{\text{FW}}$.

The components 117 to 120 in the timing channel correspond to and perform the same functions as the components 113 to 116, respectively, in the input channel and will therefore, not be described further.

The timing channel receives the signal TIN and differs from the input channel in that the output of the contract bounce eliminator 120 provides the output signal TRIG of the timing channel. The output of the contact bounce eliminator 116 in the input channel is connected to the clock input of a flip flop 121 whose data input is connected to the positive supply line +V2. The clear input of the flip flop 121 is connected to receive a signal ROS. The Q output of the flip flop 121 is connected to one of the contacts of a three-way switch 123 or movable jumper whereas the Q output of the flip flop 121 is connected to the data input of a flip flop 124 whose clock input is connected to receive a signal END and whose clear input is connected to recieve a signal $\overline{\text{RST}}$. The Q output of the flip flop 124 is connected to a second contact of the switch 123 whose third contact is connected to the common line 38. The first, second, and third positions of the switch 123 allow the input channel to be present so that it operates in a dynamic mode in which it senses changes in input signals during a time window, a static mode in which it senses changes in input signals occurring at any time, and a disabled mode, respectively. The output of the switch 123 provides an output signal Fn of the channel and is also connected so as to drive a light emitting diode 125 via an inverter 126 and current limiting resistor 127 for indicating whether that channel has detected a malfunction.

Figure 6:
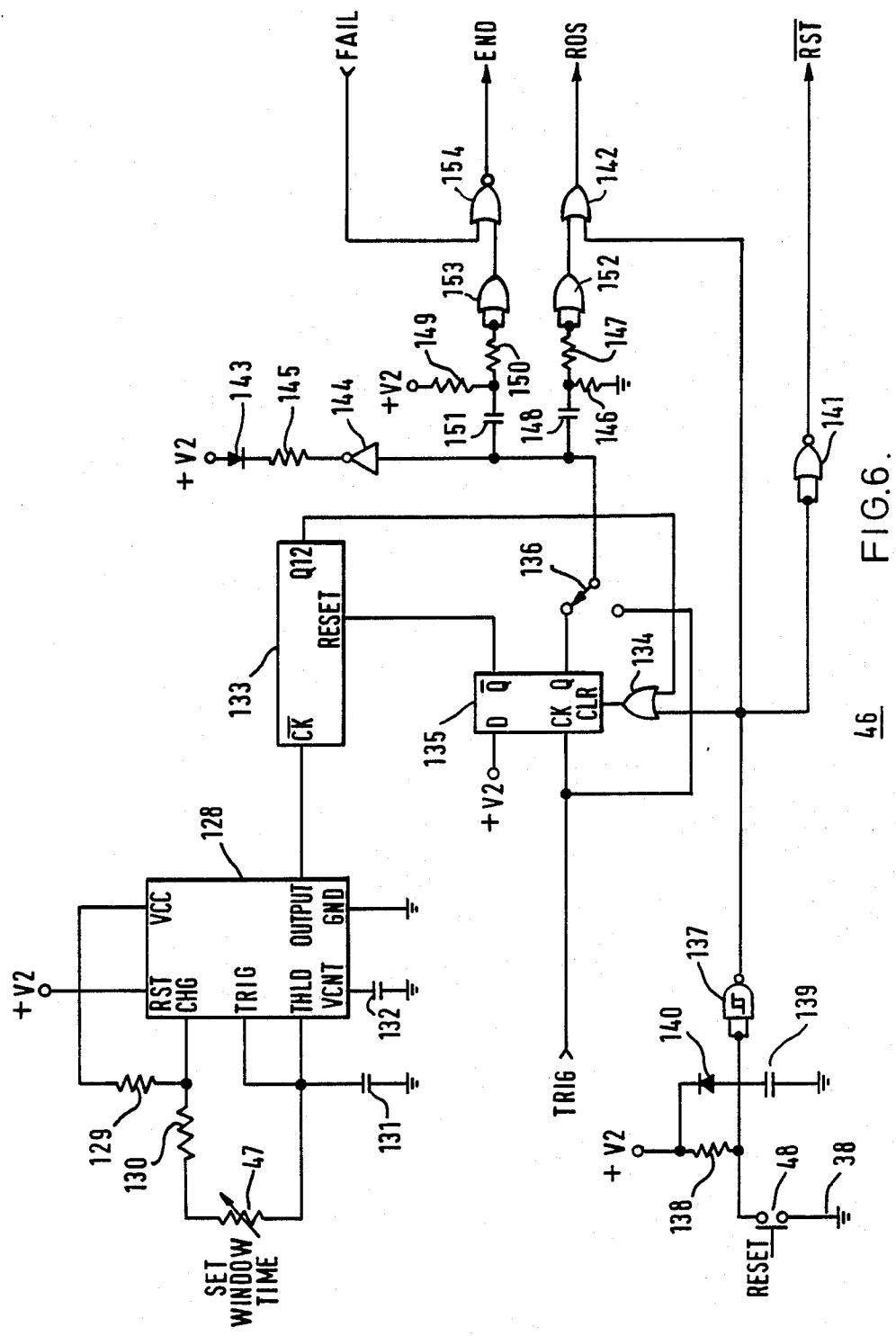

FIG. 6 shows the timing control circuit 46 in more detail. As astable multivibrator is provided by an integrated circuit 128 (type No. LM555) and associated resistors 129 and 130, capacitors 131 and 132, and the set window time control 47 which includes a variable resistor. The repetition rate of the multivibrator can be set by the control 47 to any value between 200 Hz and 13.3 KHz. The output of the multivibrator is connected to the clock input of a binary divider (for instance CMOS integrated circuit type MC14040B) 133 whose output provides a timing interval of between 150 milliseconds and 10.3 seconds depending on the setting of the set window time control 47. This output is connected to one input of an OR gate 134 whose output is connected to the clear input of a flip flop 135.

The data input of the flip flop 135 is connected to the supply line +V2 and the inverted output $\bar{Q}$ is connected to the reset input of the binary divider 133.

The output signal TRIG of the timing channel is connected to the clock input of the flip flop 135 and to one of the contacts of a two-way switch 136 or jumper, whose other contact is connected to the Q output of the flip flop 135. The two-way switch 136 is shown in its position for selecting internal generation of a timing window, i.e. the duration is set by set window time control 47 and is merely triggered by the timing switch 25. When in its other position, the two-way switch 136 selects a timing window corresponding to the opening or closing period, as selected by the switch 118, of the switch 25.

The reset switch 48 is a normally open switch connected between the common line 38 and the inputs of a Schmitt NAND gate 137 connected as an inverter. The input of the gate 137 is also connected to a de-bouncing arrangement having a resistor 138 and a capacitor 139, provided with a diode 140 for preventing reverse biasing of the input of the Schmitt NAND gate 137. The output of the Schmitt NAND gate 137 is connected to a second input of the or gate 134, the inputs of a NOR gate 141 which is connected as an inverter and whose output provides the signal $\overline{RST}$, and to one input of an OR gate 142.

The output of the two-way switch 136 drives a light emitting diode 143 via an inverter 144 and a current limiting resistor 145 for giving a visual indication of the timing window. The output of the two-way switch 136 is also connected to a first differentiating circuit which includes resistors 146 and 147 and a capacitor 148 and a second differentiating circuit which includes resistors 149 and 150 and a capacitor 151. The outputs of the first and second differentiating circuits are provided with OR gates 152 and 153, respectively, which are connected as non-inverting buffers and whose outputs are connected to the second input of the gate 142 and the first input of a NOR OR gate 154. The output of the OR gate 142 provides the signal ROS. The second input of the NOR gate 154 receives a signal FAIL and the output provides the signal END.

Figure 7:
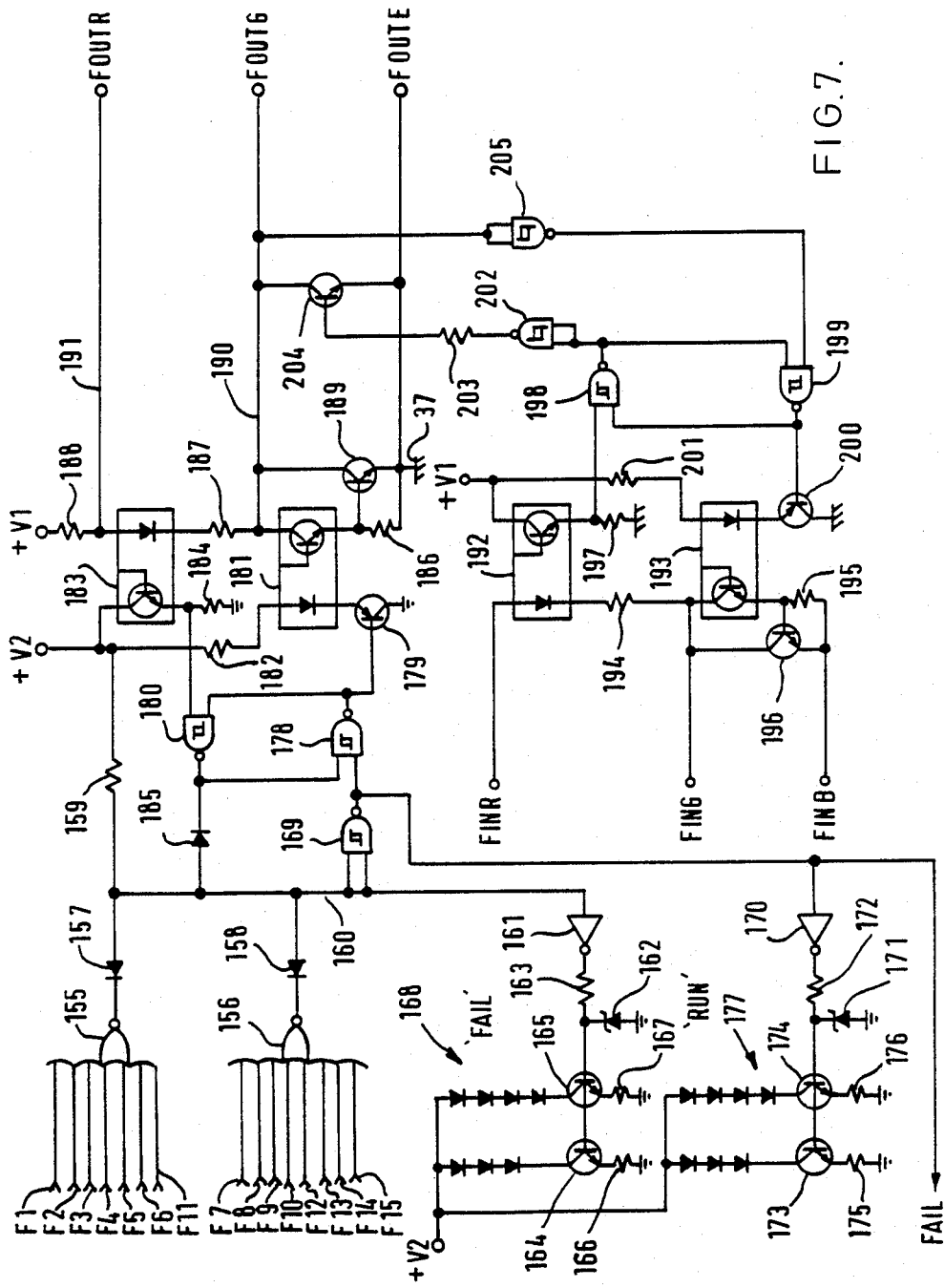

As shown in FIG. 7, the outputs F1 to F15 of the input channels are connected to a NOR arrangment having NOR gates 155 and 156, diodes 157 and 158, and a resistor 159. The output 160 of the NOR arrangement is connected to an inverter 161 whose output drives, via a voltage limiting circuit having a Zener diode 162 and a resistor 163, transistors 164 and 165 provided with current limiting emitter resistors 166 and 167 for illuminating a plurality of light emitting diodes for providing a "fail" indication when a malfunction has been detected. The output 160 is also connected to the inputs of a Schmitt NAND gate 169 connected as an inverter. The output of the gate 169 provides the FAIL signal and also drives an inverter 170 whose output is connected via a voltage limiting circuit having Zender diode 171 and a resistor 172 to the bases of transistors 173 and 174. The transistors 173 and 174 are provided with current limiting emitter resistors 175 and 176 and drive a plurality of light emitting diodes 177 for providing a "run" indication when the machine is permitted to operate.

The output of the NAND gate is connected to one input of a Schmitt NAND gate 178 whose output is connected to a base of a transistor 179 and to one input of a Schmitt NAND gate 100. The emitter of the transistor 179 is connected to the light emitting element of an optoisolater 181 provided with a current limiting resistor 182. The second input of the gate 180 is connected to the output of an optoisolator 183 which is provided with a load resistor 184. The output of the gate 180 is connected to a second input of the gate 178 and to a diode 185 which is also part of the NOR arrangement.

The light emitting element of the optoisolator 183 and the light receiving element of the optoisolater 181 are connected in a series circuit between the supply line +V1 and the common line 37 together with resistors 186, 187, and 188. The base and emitter of a transistor 189 are connected across the resistor 186 and the collector thereof is connected to a line 190 which is connected to the connection point between the resistor 187 and the optoisolator 181. The connection between the optoisolator 183 and the resistor 188 is connected to a line 191. The lines 37, 190, and 191 are connected to terminals FOUTB, FOUTG, and FOUTR. respectively.

The light emitting element of an optoisolator 192 ans the light receiving element of an optoisolator 193 are connected in series together with resistors 194 and 195 between terminals FINR and FINB. The base-emitter junction of a transistor 196 is connected across the resistor 195 and the collector thereof is connected to the connection point between the resistor 194 and the optoisolator 193 and to a terminal FING.

The light receiving element of the optoisolator 192 is provided with a load resistor 197 and is connected to one input of a Schmitt NAND gate 198. The output of the NAND gate 198 is connected to one input of a Schmitt NAND gate 199 whose output is connected to the second input of the NAND gate 198 and to the base of a transistor 200. The emitter of the transistor 200 drives the light emitting element of the optoisolator 193 and is provided with a current limiting resistor 201.

The output of the NAND gate 198 is also connected to the inputs of a Schmitt NAND gate 202 connected as an inverter. The output of the NAND gate 202 is connected via a resistor 203 to the base of a transistor 204 whose emitter and collector are connected to the lines 37 and 190, respectively. The line 190 is connected to the inputs of a Schmitt NAND gate 205 which is connected as an inverter and whose output is connected to the second input of the NAND gate 199.

The input terminals FINR, FING, and FINB and the output terminals FOUTR, FOUTG, and FOUTB allow the malfunction detector to be coupled to other similar malfunction detector for instance so as to allow shutdown of a complete system in response to detection of failure in any part of the system.

Figure 8:
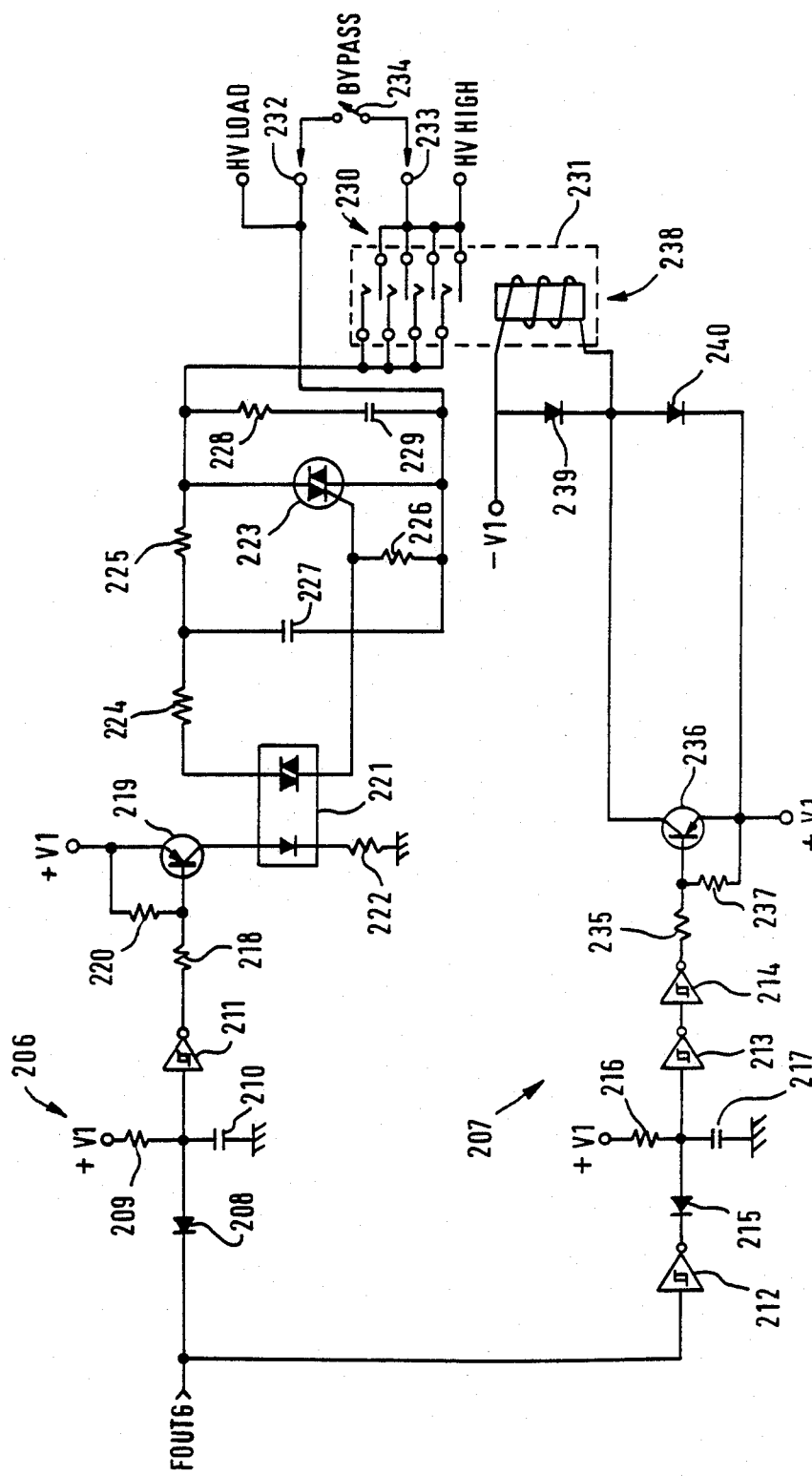

The terminal FOUTG is connected to first and second delay circuts 206 and 207 as shown in FIG. 8. The first delay circuit includes a diode 208, a resistor 209, a capacitor 210, and a Schmitt inverter 211. The second delay circuit includes Schmitt inverters 212, 213, and 214, a diode 215, a resistor 216, and a capacitor 217. The output of the first circuit is connected via a current limiting resistor 218 to the base of transistor 219 which is provided with a biasing resistor 220 and whose collector drives the light emitting element of an optoisolator 221 provided with a current limiting resistor 222. (The optoisolator 25 corresponds to the optoisolator 181). The light receiving element of the optoisolator 221 is connected to the gate of a triac 223 by a means of a network having resistors 224, 225, and 226 and a capacitor 227 for permitting actuation of the triac 223 only at the zero crossing points of the alternating current power supply. A network including a resistor 228 and a capacitor 229 is connected across the triac 223 so as to prevent false actuation thereof in the presence of transient voltages on the power supply. The anode and cathode of the triac 223 are connected between first terminals of contacts 230 of an electromagnetic relay 231 and paralleled terminals HVLOAD and 232. The other terminals of the contacts 230 are connected to paralleled terminals HVHIGH and 233. The terminals 232 and 233 are provided for the connection of a bypass switch 234.

The output of the second delay circuit 207 is connected via a current limiting resistor 235 to a transistor 236 which is provided with a biasing resistor 237 and whose collector drives the coil 238 of the relay 231. Normally reverse-biased diodes 239 and 240 are connected across the coil 238 and the transistor 236, respectively, for suppressing reverse EMF and preventing reverse biasing of the transistor 236.

Operation of the malfunction detector is as follows. The detector 53 in each input channel has a threshold which corresponds to a threshold resistance at the sensor switch. The threshold is determined by the amplitudes of the voltages on the lines 71 and 94, and by the values of the resistors 70, 72, and 96. With the lines 71 and 94 carrying RMS signals of 1 volt and 12.6 volts and with the values of the resistors 70 and 72 selected as 100 kilohms and 1 kilohm, respectively, the threshold may be sent by adjusting the value of the resistor 96 to 11 times the required threshold resistance. A threshold resistance of 300 ohms has proved suitable in use so that the value of the resistor 96 in this case is 3.3 kilohms. The output of the amplifier 61, therefore, switches when the resistance at the input 50 changes from less than 300 ohms to greater than 300 ohms and vice versa, taking due account of the hysteresis provided by the resistors 70 and 72 Detection of a change of state of sensor switch is substantially unaffected by contaminated contacts and reduced insulation resistance which can occur over a period of time, since the switch will present a resistance of much less than 300 ohms in its closed state and much more than 300 ohms in its open state in all feasible operating conditions of the switch.

The detector 53 functions as follows. When the sensor connecting to the terminal 50 is open, the alternating voltage at the inverting input of the amplifier 61 derived from the line 94 via the resistors 96 and 59 is limited to plus and minus 7.2 volts by the diodes 64 and 65 connected to the lines 62 and 63. The inverting input thus receives a clipped sinewave which is compared with the reference signal on the line 71 and the output of the amplifier is a square wave 180° out of phase with the reference signal. When the sensor is closed, the voltages at the inverting input is less than the 1 volt of the reference signal on the line 71 and the amplifier output is a square wave in phase with the reference signal.

The value of the components in the radio frequency and spike filters 51 and 52, and particularly the value of the inductor 57, are such that any spurious mains frequency signals from lines connected to the input 50 are shifted in phase, for instance by approximately 90°. The subsequent phase detector thus ignores such spurious signals and provides a high degree of immunity to "noise" signals, especially at mains frequency.

The corresponding parts of the timing channel function in the same way and will therefore, not be described further.

In an alternative embodiment (not shown), the filters do not perform this phase shifting function but instead a phase shifted test voltage is injected into the frame of the press and is supplied to the phase detectors. The level of the phase-shifted voltage appearing via the sensors at the input 50 is thus detected in order to determine whether the sensors are open or closed.

The output of the amplifier 61 is supplied via the optoisolator 54, which ensures that the succeeding circuitry is fully isolated from the preceding circuitry in the channels. The risk of introducing interference into the logic circuutry via shared supply and common lines is, therefore, eliminated. Also, the problem of hum loops or ground loops is eliminated because of this isolation.

The signals PHI adn $\overline{PHI}$ are complementary to each other such that one is at a high level and the other at a low level for the first half cycle of each cycle of the test signal, and vice versa for the second half cycle. The spinal $\overline{FW}$ provided by combining the outputs of the monostable multivibrators 105 and 110 is a series of pulses of predetermined widths, each commencing at the zero crossing of the test signal.

The EXCLUSIVE-OR gate 113 acts as a selectable inverting/non-inverting circuit depending on the position of the two-way switch 114. This switch is preset according to whether a normally open or normally closed sensor switch is connected to the input 50 of the channel. The output of the EXCLUSIVE-OR gate 113 is latched in the flip flop 115 under control of the signal $\overline{FW}$ and passed to the contact bounce eliminator 116, which is clocked by the signals $\overline{FW}$. The contact bounce eliminator 116 only produces an output when the signal level at its input changes and then remains constant for a predetermined number of clock pulses, such as six pulses.

Up to this point, operation of the timing channel is identical, and the output of the contact bounce eliminator 120 in the timing channel provides the output signal to the timing control circuit 46. However, the input channels contain further components to allow for selection of static operation, dynamic operation, or disabling.

In the static mode, sensor switches are constantly monitored in order to detect malfunction at any time. For instance, the end of stock switch 5, the buckle switch 8, and the guard switches are monitored constantly for malfuntion of the machine and the channels connected to these switches are, therefore, preset for static mode of operation. With the two-way switch 123 connected to the Q output of the flip flop 121, the channel is set in the static mode and monitors a change of switching state of the sensor switch at any time while the malfunction detector is switched on. A logic high level signal is clocked into the flip flop 121 in response to the output of the contact bounce eliminator 116 in the event of detection of a malfunction, and this provides the output signal Fn of the channel. Also, the light emitting diode 125 is illuminated to indicate where the malfunction was detected. This condition remains until the flip flop 121 is cleared.

In the dynamic mode, the three-way switch 123 is connected to the Q output of the flip flop 124. The input channel, therefore, only responds to a change of state of the sensor switch during the timing window generated by the timing control circuit 46. The flip flop 121 is cleared at the start of each timing window and data is clocked into the flip flop 124 at the end of each timing window. Thus, a channel signal Fn is only produced if a change of state of the sensor switch registering a change from normal operation to malfunction occurs between the start and end of the timing window.

With the two-way switch 136 in the position shown in FIG. 6, an internally generated timing window whose duration is set by the set window time control 47 is produced each time the timing channel supplies a signal TRIG. When the signal TRIG is received, the flip flop 135 is clocked and enters a logic level 1 as supplied to the data input. The output $\overline{Q}$ goes low, thus removing the reset signal from the divider 133 allowing it to begin counting pulses from the astable multivibrator. The binary divider 133 counts pulses until it produces an output signal at its Q12 output, which clears the flip flop 135 and applies a reset signal to the binary divider 133. The Q output of the flip flop 135 goes low, thus ending the timing window. The timing control circuit 46 produces a pulse of predetermined period as the signal ROS at the start of the timing window and a pulse of predetermined period END at the end of the timing window, the latter being overridden in the presence of a FAIL signal.

When the two-way switch 13 is in its alternative position, the timing window is generated by the output signal TRIG of the timing channel.

When a malfunction has been detected, and remedial action taken, the malfunction detector is reset by pressing the reset switch 48. This supplies a signal of predetermined duration $\overline{RST}$ to clear the flip flop 124 and a clear signal to the flip flop 135 to reset the timing control circuit 46 for further monitoring by the malfunction detector.

When any of the fifteen channels produces an output signal corresponding to detection of malfunction, the output line 160 of the NOR arrangement goes low. The FAIL signal goes high, thus disabling the NAND gate 154 in the timing control circuit 46 and the light emitting diodes are illuminated. A signal to other malfunction detectors is supplied via the optoisolator 181, the gates 205 and 199, and the optoisolator 193. The signal is also supplied to the driver logic circuit 33 and the delay circuits 206 and 207 actuate the triac 223 and the relay 231 so that the triac breaks the power supply to the punch press 2 at the next zero crossing of the alternating current power supply and shortly thereafter the contacts 230 of the relay 231 are opened. Because these contacts do not break current, there is no danger of arcing. However, if the triac 223 fails in its short-circuit mode, then the relay contacts provide back-up and ensure that the power supply circuit to the punch press is broken.

This condition persists until the reset switch is actuated, thus clearing the fault signal. The output line 160, therefore, goes low so that the light emitting diodes 168 are extinguished and the light emitting diodes 177 are illuminated via the NAND gate 169. The FAIL signal is removed, thus allowing the timing control circuit 46 to recommence operation and the "fail" signal to any other connected malfunction detectors is removed. The relay contacts 230 are closed and, shortly thereafter at a supply zero-crossing, the triac 223 is actuated to allow the punch press to restart.

If the malfunction detector is connected to other malfunction detectors of the same type and receives from one such detector a "fail" signal, this is supplied via the optoisolator 183 or via the optoisolator 192, the NAND gates 198 and 202 and, the transistor 204, to the NOR arrangement, which then behaves as though an internally generated malfunction signal had been produced. The triac 223 and the relay 231 are then deactuated so as to disconnect the punch press from the power supply. This condition persists until the "fail" signal from the remote malfunction detector is removed. However, in this case, it is not necessary to reset the local malfunction detector individually.

If not all of the input channels are required in a particular application, the three-way switch 128 in each channel is connected to the common line 38 so as to disable that channel.

The input and timing channels thus provide a high degree of immunity to interfering signals. The extensive input filtering and the synchronous detection of changes of state of sensor switches prevents, or at least greatly reduces the chances of, incorrect actuation by spurious or interfering signals. In the dynamic mode of operation, the detection of changes of state of the sensor switches, rather than merely responding to the presence of a particular state, prevents a condition wherein a sensor switch fails in the safe switch state and the machine continues to operate without proper malfunction detection. The use of a series connected triac and relay improves the security against failure of either component and also allows the contacts of the relay to operate in the absence of mains power so as to eliminate contact arcing. The relay contacts only operate in the presence of power in the event of a failure in the short-circuit mode of the triac. The malfunction detector is thus substantially more reliable than previously known devices of this type.

The programming arrangements of the timing control circuit 46 and the input and timing channels greatly improve the versatility and adaptability of the malfunction detector. It may, therefore, be used for detection of malfunction in virtually any machine requiring static and/or dynamic monitoring for malfunction. The programming switches may easily be preset in accordance with the arrangement of sensor switches for a particular environment and the sensor switches may be exchanged as a modular unit with the punch die when the punch press is to be used for producing parts of a different type. Programming for such a change of function is simple and quick and does not require any detailed programming techniques to be learned. Instead, a relatively simple diagram illustrating the positions of the switching may be provided in association with a specific application and die.

I claim:

1. A malfunction detector for detecting a malfunction in a machine having switch responsive to an operational parameter of said machine, said malfunction detector comprising:

supplying means for supplying an alternating current test signal to said switch means, said supplying means comprising generating means for generating said alternating current test signal with a frequency equal to the product of a mains frequency and a positive non-zero integer and with a phase which is shifted by a predetermined amount with respect to said mains phase; and determining means for determining whether the resistance of said switch means to said alternating current test signal exceeds a threshold value, said determining means comprising phase detection means for responding only to a detection signal from said switch means having the same frequency and phase as said alternating current test signal.

2. A malfunction detector as claimed in claim 1, wherein said determining means comprises means for responding to a predetermined number of cycles of said detection signal.

3. A malfunction detector as claimed in claim 1, wherein said supplying means further comprises a series resistance connected between said generating means and said switch means; and means for providing an alternating reference volatge having the same frequency as said alternating current test signal; and wherein said determining means further comprises comparator means for comparing the voltage of said detection signal with said alternating reference voltage.

4. A malfunction detector as claimed in claim 1, further comprising deactivating means responsive to said determining means for deactivating said machine upon detection of a malfunction.

5. A malfunction detector as claimed in claim 4, wherein said deactivating means comprises a series circuit comprising a semiconductor switch and an electromagnetic relay contact for connection in a power supply line of the machine.

6. A malfunction detector as claimed in claim 5, wherein said detecting means comprises control means for opening said semiconductor switch before opening said relay contact and for closing said relay contact before closing said semiconductor switch.

7. A malfunction detector as claimed in claim 1, wherein said determining means comprises timing means for generating a timing window; and for means for responding to a change from a first switching state to a second switching state of said switch means during said timing window.

* * * * *

UNITED STATES PATENT AND TRADEMARK OFFICE
CERTIFICATE OF CORRECTION

PATENT NO. : 4,837,656
DATED : June 6, 1989
INVENTOR(S) : Austen B. Barnes It is certified that error appears in the above-identified patent and that said Letters Patent is hereby corrected as shown below:

Column 1, line 15, delete "recongnize" and insert ---- recognize ----.

Column 1, line 64, delete "than" and insert ---- then ----.

Column 2, line 63, delete "improves" and insert ---- improved ----.

Column 3, line 12, delete "and" and insert ---- to ----.

Column 3, line 39, after "die" insert ---- and ----.

Column 4, line 9, delete "swithch" and insert ---- switch ----.

Column 4, line 11, before "switch" insert ---- timing ----.

Column 4, line 20, delete "6" second occurrence and insert ---- 8 ----.

Column 4, line 22, delete "guard in place" and insert ---- "guard in place" ----.

UNITED STATES PATENT AND TRADEMARK OFFICE
CERTIFICATE OF CORRECTION

PATENT NO. : 4,837,656

DATED : June 6, 1989

INVENTOR(S) : Austen B. Barnes

It is certified that error appears in the above-identified patent and that said Letters Patent is hereby corrected as shown below:

Column 4, line 28, after "and" insert ---- a ----.

Column 4, line 32, delete "optiosolator" and insert ---- optoisolator ----.

Column 4, line 36, delete "cirucits" and insert ---- circuits ----.

Column 4, line 61, delete "31" and insert ---- 36 ----.

Column 5, line 4, delete "swtich" and insert ---- switch ----.

Column 5, line 16, delete "(n=1...15)" and insert ---- n=1...15) ----.

Column 5, line 17, delete "teh" and insert ---- the ----.

Column 5, line 19, delete "freuqency filter 21" and insert ---- frequency filter 51 ----.

Column 5, line 28, delete "incluudes as" and insert ---- includes an ----.

Column 5, line 35, delete "zener" and insert ---- Zener ----.

UNITED STATES PATENT AND TRADEMARK OFFICE
CERTIFICATE OF CORRECTION

PATENT NO. : 4,837,656

DATED : June 6, 1989

INVENTOR(S) : Austen B. Barnes

It is certified that error appears in the above-identified patent and that said Letters Patent is hereby corrected as shown below:

Column 5, line 63, delete "zener diodes 88" and insert ---- Zener diodes 89 ----.

Column 6, line 2, delete "zener" and insert ---- Zener ----.

Column 6, line 32, delete "$\overline{PW}$" and insert ---- $\overline{FW}$ ----.

Column 6, line 41, delete "as" and insert ---- at ----.

Column 6, line 52, delete "therefore," and insert ---- , therefore, ----.

Column 6, line 55, delete "contract" and insert ---- contact ----.

Column 6, line 63, delete "Q" and insert ---- $\overline{Q}$ ----.

Column 6, line 66, delete "recieve" and insert ---- receive ----.

Column 7, line 3, delete "present" and insert ---- preset ----.

Column 7, line 10, before "current" insert ---- a ----.

Column 7, line 14, delete "As" and insert ---- An ----.

Column 7, line 19, before "control" insert ---- set window time ----.

UNITED STATES PATENT AND TRADEMARK OFFICE
CERTIFICATE OF CORRECTION

PATENT NO. : 4,837,656

DATED : June 6, 1989

INVENTOR(S) : Austen B. Barnes

It is certified that error appears in the above-identified patent and that said Letters Patent is hereby corrected as shown below:

Column 7, line 37, before "set" second occurrence insert ---- the ----.

Column 7, line 51, delete "or" and insert ---- OR ----.

Column 7, line 66, before "gate" insert ---- OR ----.

Column 8, line 4, delete "arrangment" and insert ---- arrangement ----.

Column 8, line 17, delete "Zender" and insert ---- Zener ----.

Column 8, line 29, delete "optoisolater" and insert ---- optoisolator ----.

Column 8, line 37, delete "optoisolater" and insert ---- optoisolator ----.

Column 8, line 47, delete "FOUTR." and insert ---- FOUTR, ----.

Column 8, line 48, delete "ans" and insert ---- and ----.

UNITED STATES PATENT AND TRADEMARK OFFICE
CERTIFICATE OF CORRECTION

PATENT NO. : 4,837,656

DATED : June 6, 1989

INVENTOR(S) : Austen B. Barnes

It is certified that error appears in the above-identified patent and that said Letters Patent is hereby corrected as shown below:

Column 9, line 9, delete "detector" and insert ---- detectors, ----.

Column 9, line 13, delete "circuts" and insert ---- circuits ----.

Column 9, line 23, delete "25" and insert ---- 35 ----.

Column 9, line 25, delete "a" second occurrence.

Column 9, line 57, delete "sent" and insert ---- set ----.

Column 9, line 65, delete "72" and insert ---- 72. ----.

Column 10, line 5, delete "connecting" and insert ---- connected ----.

Column 10, line 13, delete "voltages" and insert ---- voltage ----.

Column 10, line 26, delete "therefore," and insert ---- , therefore, ----.

Column 10, line 38, delete "channels" and insert ---- channel ----.

UNITED STATES PATENT AND TRADEMARK OFFICE
CERTIFICATE OF CORRECTION

PATENT NO. : 4,837,656

DATED : June 6, 1989

INVENTOR(S) : Austen B. Barnes

It is certified that error appears in the above-identified patent and that said Letters Patent is hereby corrected as shown below:

Column 10, line 39, delete "circutry" and insert ---- circuitry ----.

Column 10, line 43, delete "adn" and insert ---- and ----.

Column 10, line 47, delete "spinal and insert ---- signal ----; same line, delete "provided" and insert ---- produced ----.

Column 11, line 7, delete "malfuntion" and insert ---- malfunction ----.

Column 11, line 9, delete "two-way" and insert ---- three-way ----.

Column 11, line 39, before "divider" insert ---- binary ----.

Column 11, line 51, delete "13" and insert ---- 136 ----.

Column 12, line 27, delete "202 and," and insert ---- 202, and ----.

Column 12, line 37, delete "128" and insert ---- 123 ----.

Column 13, line 7, delete "switching" and insert ---- switches ----.

UNITED STATES PATENT AND TRADEMARK OFFICE
CERTIFICATE OF CORRECTION

PATENT NO. : 4,837,656

DATED : June 6, 1989

INVENTOR(S) : Austen B. Barnes

It is certified that error appears in the above-identified patent and that said Letters Patent is hereby corrected as shown below:

Column 13, line 11, after "switch" insert ---- means ----.

Column 14, line 7, delete "volatge" and insert ---- voltage ----.

Column 14, line 22, delete "detecting" and insert ---- deactivating ----.

Column 14, line 28, delete "for" second occurrence.

Signed and Sealed this

Third Day of December, 1991

Attest:

HARRY F. MANBECK, JR.

*Attesting Officer*       *Commissioner of Patents and Trademarks*